ns derfer et al.

United States Patent [19]
Blickensderfer et al.

[11] 4,420,571
[45] Dec. 13, 1983

[54] PHENOLIC FRICTION PARTICLES

[75] Inventors: John R. Blickensderfer; Luba A. Pacala, both of Belle Mead, N.J.

[73] Assignee: Union Carbide Corporation, Danbury, Conn.

[21] Appl. No.: 397,896

[22] Filed: Jul. 13, 1982

Related U.S. Application Data

[63] Continuation of Ser. No. 141,142, Apr. 17, 1980, abandoned.

[51] Int. Cl.$^3$ .......................... C08J 5/14; C08L 5/00; C08L 61/06
[52] U.S. Cl. .................................. 523/149; 523/156; 523/157; 524/55; 528/137; 528/147; 528/155
[58] Field of Search .............. 260/DIG. 39; 528/140, 528/145, 146, 147, 137, 155; 523/156, 157, 149, 152; 524/55

[56] References Cited

U.S. PATENT DOCUMENTS

| | | | |
|---|---|---|---|
| 3,864,304 | 2/1975 | Grazen et al. | 260/38 |
| 4,014,828 | 3/1977 | Thorpe | 260/16 |
| 4,014,850 | 3/1977 | Thorpe | 260/38 |
| 4,101,500 | 7/1978 | Brodsky | 260/38 |
| 4,206,095 | 6/1980 | Wynstra et al. | 260/17.2 |

*Primary Examiner*—Allan Lieberman
*Attorney, Agent, or Firm*—William E. Dickheiser; Henry H. Gibson

[57] ABSTRACT

Compositions useful as friction particles comprised of tri- and/or tetrafunctional phenol, difunctional phenol, aldehyde, a protective colloid, and a reaction promoting compound. The friction particles are formulated into friction elements. A process for producing the friction particles in particulate form.

20 Claims, No Drawings

PHENOLIC FRICTION PARTICLES

This application is a continuation of our prior U.S. application Ser. No. 141,142, filed Apr. 17, 1980 and now abandoned.

BACKGROUND OF THE INVENTION

Friction particles are compositions which find wide use in the formulation of friction elements. A friction element is a composition useful for imparting friction to a moving device without harming such device. Examples of friction elements are drum brake linings, disc brake pads, heavy-duty truck blocks and clutch plate facings. Generally about 5 to 15 weight percent of a friction element is composed of friction particles. A friction particle is a particulate material having the properties of no substantial softening, flowing together, or cohering at elevated temperatures. The friction particles are employed in the friction element for many reasons such as to reduce the frictional wear of the element, to smooth out the coefficient of friction values over wide temperature ranges and to provide a soft pedal action upon the application of the brake or similar device.

Friction particles have traditionally been prepared from cashew nutshell liquid (CNSL) which is a mixture of about 90 percent anacardic acid and 10 percent cardol. These friction particles have given very satisfactory results in friction element applications, but in recent years a number of disadvantages associated with their use have arisen. One major disadvantage is the rapidly increasing cost of the cashew oil. This is due to many factors such as reduced and unreliable supply caused by bad weather conditions and political instability in the major exporting countries of the oil as well as the increasing costs associated with shipping the oil. Another problem is the highly dermatitic nature of the cardol compound of the cashew oil; this is the cause of much disatisfaction among compounders of friction element formulations. A further disadvantage is the dusty nature of the friction particles due to the grinding process employed in their preparation; this dustiness is uncomfortable in itself and sometimes results in smoldering.

In response, there have been many efforts to synthesize a friction particle which will impart to a friction element the beneficial of CNSL friction particles, but without the disadvantages of these friction particles. One such friction particle is disclosed in U.S. Pat. No. 3,864,304—this is non-catalyzed product of the reaction of from about 225° F. to 400° F. of a non-hydroxy alkylated, hydroxy aromatic hydrocarbon-aldehyde resole containing substantially no etherified aromatic hydroxyl groups with an alkylated hydroxy aromatic hydrocarbon-aldehyde resole, wherein the non-hydroxyalkylated resole comprises about 60 to 95 weight percent of the resin.

Because of the wide use of such friction particles in many devices commonly employed today, any new friction particle which can be synthetically produced and which will give comparable or improved performance over that obtained from conventional CNSL friction particles would be of great advantage.

SUMMARY OF THE INVENTION

It has now been found that resin compositions comprising (I) a mixture of phenols said mixture comosed of from 25 to 100 mole percent of tri-and/or tetrafunctional phenols and from 0 to 75 mole percent of a difunctional phenol, (II) from 1.1 to 3 moles per mole of phenol moiety of an aldehyde, (III) from 0 to 1 mole per mole of phenol moiety of a reaction promoting compound, and (IV) from 0.05 to 6 weight percent based on the weight of components (I), (II), and (III) of a protective colloid, all as hereinafter more fully defined, will give very beneficial results when used as friction particles; their performance generally equals or exceeds that of CNSL friction particles and their use reduces or avoids many of the disadvantages associated with GNSL friction particles.

DESCRIPTION OF THE INVENTION

In this application the functionality of the phenol refers to the number of unsubstituted ortho and para carbon atoms on the aromatic ring or rings.

The trifunctional phenols suitable for use in the compositions of this invention include phenol itself (monohydroxybenzene) and the meta substituted derivatives of phenol such as m-cresol, resorcinol, m-chlorophenol, 3,5-dimethylphenol, and the like.

The tetrafunctional phenols suitable for use in the compositions of this invention include 2,2-bis(4-hydroxyphenyl) propane, 2,2-bis(4-hydroxyphenyl)ethane, 4,4'-dihydroxydiphenylsulphide, 4,4'-dihydroxydiphenylsulphone, 4,4'-dihydroxybiphenyl, and the like.

The difunctional phenols suitable for use in the compositions of this invention include p-cresol, p-chlorophenol, o-cresol, p-phenylphenol, p-cyclohexylphenol and alkyl substituted phenols wherein the alkyl groups are saturated or unsaturated, substituted or unsubstituted, and contain from 1 to 18 carbon atoms such as p-nonylphenol, p-t-butylphenol, p-styrenated phenol, and phenols substituted with ethylenically unsaturated hydrocarbons such as linseed-type oils.

The aldehydes useful in the compositions of this invention are those containing from 1 to 11 carbon atoms such as formaldehyde in any of its forms such as formalin or paraform, acetaldehyde, propionaldehyde, butyraldehyde, isobutyraldehyde, furfuraldehyde, benzaldehyde, salicylaldehyde, crotonaldehyde, parahydroxybenzaldehyde glyoxal, glutaraldehyde, naphthaldehyde, and the like.

A protective colloid as used in this application is a composition capable of promoting the production of, and/or maintaining, a phenolic resin-in-water dispersion wherein the phenolic resin is the dispersed phase and the aqueous medium is the dispersing or continuous phase.

The protective colloids useful in the compositions of this invention include gum arabic, partially hydrolyzed polyvinylacetate, modified and unmodified guar gums, gum ghatti, hydroxyethylcellulose, carboxymethylcellulose, soluble starch, agar and the like, and mixtures thereof. The preferred protective colloids are gum arabic and the modified guar gums.

The trifunctional phenol or tetrafunctional phenol or tri- and tetrafunctional phenol mixture is present in a concentration of from 25 to 100 mole percent, preferably from 55 to 100 mole percent based on the total moles of phenolic monomers present; the balance of the phenolic monomers is composed of the difunctional phenol. The aldehyde is present in a concentration of from 1.1 to 3 moles, preferably from 1.1 to 2 moles per mole of phenol moiety. A phenol moiety, as used in this application, is a hydroxy substituted aromatic ring.

Thus monohydroxy benzene has 1 phenol moiety, 2,2-bis(4-hydroxyphenyl) propane has 2 phenol moieties, etc.

The protective colloid is employed in an amount sufficient to produce a resin-in-water dispersion, generally from 0.05 to 6 weight percent and preferably it is from 0.1 to 5 weight percent, most preferably from 2 to 3 weight percent, based on the weight of total organic components.

The compositions of this invention can also contain optional ingredients such as wetting agents and other surfactants, fillers, extenders, pigments, dyestuffs, toughening agents, reinforcing agents and other additives known to those skilled in the art in the proportions normally employed which proportions are also well known to those skilled in the art.

The compositions of this invention are produced by a two-step process. The first step involves the condensation reaction between the phenolic monomer or mixture of monomers with the aldehyde. The second step involves the curing of the phenolic resin product of the first step.

The first step of the two-step process is promoted by a reaction promoting compound or catalyst. This compound can be of two types; it can be an alkali or alkaline earth hydroxide or oxide such as sodium hydroxide, potassium, hydroxide, calcium, hydroxide, barium hydroxide, calcium oxide and the like; or it can be an amine compound. The useful amine compounds include the primary, secondary and tertiary amines having up to 10 carbon atoms such as ammonia, hydrazine, methylamine, ethylamine, dimethylamine, trimethylamine, ethylenediamine, hexamethylenetetramine, aniline, cyclohexylamine, benzylamine, ethanolamine, and the like. Of course mixtures of the above reaction promoting compounds can be employed. The preferred reaction promoting compounds are ammonia or hexamethylenetetramine.

When the amine type compound is employed as the reaction promoting compound it can become incorporated into the product compositions.

The reaction promoting compound is present in the first-step or condensation reaction mixture in a concentration of from 0.01 to 1 mole, preferably from 0.01 to 0.2 mole, per mole of henol moiety.

The condensation reaction mixture also contains water; the minimum amount of water necessary is that which is sufficient to produce a resin-in-water dispersion. The preferred amount of water will vary depending on the specific formulation but in general it will be from about 40 to 60 weight percent of the entire reaction mixture. There is no real maximum amount of water which can be employed but no particular advantage is generally obtained when a large excess of water is employed.

The reactants are employed in the condensation reaction mixture in proportion such that the resulting phenolic resin is of the thermosetting type. Generally this is achieved by keeping the ratio of reactive hydrogen equivalents on methylene to the reactive hydrogen equivalents on the aromatic rings at from 0.75 to 1.5, preferably from 1 to 1.5.

The condensation reaction is carried out by charging the aldehyde, the phenolic monomers, the reaction promoting compound, the protective colloid, water, and other additives if employed, to a reaction vessel; the reaction mixture is then heated under agitation to a temperature of from 50° C. to 100° C., preferably from 60° C. to 100° C., most preferably from 90° C. to 100° C. Of course the reaction temperature may be higher than 100° C. if the reaction is run at a pressure above 1 atmosphere. Alternatively one or more of the reactants can be charged after the initiation of heat and/or agitation or one or more of the reactants can be continuously charged to the reaction for at least a portion of the reaction time. However, as is known to those skilled in the art, the aldehyde should not be initially reacted with the reaction promoting compound. The reaction mixture is heated at least until an aqueous dispersion of a particulate, heat reactive and substantially water-insoluble phenolic resin is formed.

As used above and throughout this application the following are defined as:

Phenolic resin—a condensation product of a phenol and an aldehyde.

Aqueous dispersion—a mixture wherein the dispersing or continuous phase is composed primarily of water, although some organic material will be dissolved in the aqueous phase and some water will be contained in the dispersed resin phase.

Particulate phenolic resin—a finely divided organic phase having a maximum particle size of about 2 millimeters.

Heat reactive—a phenolic resin that is capable of polymerization at a usefully practicable rate when subjected to elevated temperatures, such as above about 100° C., although such resins will advance slowly, but measurably, at lower temperatures.

Substantially water-insoluble—a phenolic resin that is capable of existing as a separate phase in an aqueous medium, though it may contain a finite proportion of water-soluble components.

The second step of the process for producing the compositions of this invention involves advancing the phenolic resin from the first step to a substantially completely reacted state. This is accomplished by the addition an acidic compound such that the pH of the resin mixture is from about 0 to 4, preferably from 1 to 3. Suitable acidic compounds include acids such as sulfuric acid, hydrochloric acid, nitric acid, phosphoric acid, chloroacetic acid, toluenesulfonic acid, and the like, or any substance which releases a strong acid in water. After the pH has been adjusted the mixture is then heated at up to 100° C. until the resin product has substantially completely been cured. However, the addition of certain acids may cure the resin product without the need for application of external heat.

After this second step, the product is separated from the aqueous phase by any method effective in removing particulate material from a liquid phase; a convenient separation method is suction filtration. The product may then be washed with water and is dried. Use of a fluidized bed drier for this purpose has been found to be quite effective.

The product is thus recovered in particulate form and in the size range required for friction particles. Thus such costly, time consuming, and at times uncomfortable and possibly dangerous steps such as grinding and sieving, which have heretofore been necessary in the preparation of conventional friction particles, are avoided. Also this substantially reduces the possibility of incapacitating the reactor due to resin gelation which has been a problem in conventional bulk polymerization processes for preparation of phenolic resin. The particle size distribution of the compositions of this invention can be substantially controlled by the amount and/or type of protective colloid used and/or the level of agitation employed during the reaction. Generally the greater the amount of protective colloid employed and the greater the amount of agitation employed the smaller is the particle size of the product. Thus, practitioners of the art can produce friction particles of different sizes depending on the specific use to which they will be put.

The compositions of this invention can be used per se or be used as friction particles by incorporation into friction elements. Those skilled in the art are familiar with the conventional formulations and means of producing friction elements. Friction elements employing the novel friction particles of this invention may be comprised of from 30 to 70 weight percent of high friction fibrous material, usually asbestos or a non-asbestos material such as metallic, glass or mineral fibers or the like, up to about 40 weight percent of an inorganic filler material such as barium sulfate, litharge, hydrated alumina, cryolite, molybdenum disulfide, and others which are known to those skilled in the art, from 5 to 30 weight percent of a friction binder and from about 1 to about 25 weight percent, preferably from about 5 to about 15 weight percent, of friction particles of this invention. The friction element formulation can be molded at elevated temperature and pressure and baked to produce the finished friction element. Those skilled in the art are familiar with the procedures of producing friction elements.

It was completely unexpected that the compositions of this invention would have such a beneficial effect when employed as friction particles in friction elements. Now, by employing the teachings of this invention, practitioners of the art can produce friction particles completely from synthetic materials and without the need for grinding and sieving thus avoiding or substantially reducing many of the problems associated with the heretofore available friction particles. The friction particles of this invention, when formulated into friction elements, give comparable or improved results over those obtained from friction elements employing conventional CNSL friction particles. These highly beneficial results could not have been predicted.

The following examples serve to further illustrate the invention.

EXAMPLE 1

There were charged to a one liter, 3-neck reaction flask equipped with a mechanical stirrer, thermometer and water-cooled reflux condenser 123 grams (1.31 moles) of phenol, 82 grams (0.37 mole) of nonylphenol (NP), 133 grams of a 50 percent aqueous formaldehyde solution (2.21 mole), 18 grams (0.13 mole) of hexamethylenetetramine, 2 grams of a nonylphenol ethoxylate surfactant, 4.8 grams of gum arabic, 1.2 grams of guar gum and 231 grams of water. The mixture was heated at atmospheric reflux (100° C.) for 2 hours then cooled to about 50° C.; the pH was then adjusted to 2 by the addition of a 10 percent solution of sulfuric acid and the mixture was heated at reflux for 3.25 hours. the particles that formed containing 22 mole percent of nonylphenol and 78 mole percent of phenol were then isolated by suction filtration, washed with water, and dried at 60° C. for 30 minutes in a fluidized bed dryer.

The above described procedure was repeated to produce particles containing 39 mole percent nonylphenol and 61 mole percent phenol. In this synthesis the phenol charged was 102.4 grams (1.09 moles), the nonylphenol charged was 153.9 grams (0.70 moles), there was no surfactant present, the protective colloid was 2 grams of gum arabic and the water amounted to 256 grams; all other process parameters were the same as above except that after the addition of the sulfuric acid, the mixture was heated at reflux for 24 hours.

Friction elements were produced by combining 60 weight percent of asbestos, 20 weight percent of a low molecular weight, unmodified novolak capable of sufficiently wetting the individual fibers in the asbestos bundles and typical of organic friction binders used in the industry, 10 weight percent of barium sulfate as filler and 10 weight percent of one of the two friction particles produced above, molding to 100 percent theoretical density at 375° F. under 2000 psi for 15 minutes, and baking for 8 hours at 450° F. For comparative purposes another friction element was produced using the same procedure as above but substituting for the friction particle of this invention a commercially available, widely used, CSNL-based friction particle having a similar particle size distribution to that of the above-described friction particles. The friction elements produced were one inch square and from about 0.24 to 0.29 inches thick.

The friction elements were evaluated as follows: the friction element was mounted on a standard Chase-type friction testing machine in such a manner as to bring it in contact with a rotating drum surface. With the drum rotating at constant speed of 20 feet per second contact was effected for 10 seconds with a constant applied force of 150 psi; then the element was separated from the drum surface for 10 seconds; this cycle was performed 100 times. This 100 cycle procedure was performed at 400° F., 600° F., 800° F., and again at 400° F. The coeffecient of friction was measured during each procedure when the rotating element was in contact with the rotating drum surface and the wear was determined after each procedure by measuring the weight loss for each friction element. After all four 100 cycle procedures were completed the total percentage weight and thickness loss was determined for each friction element. The results are shown in Table I.

TABLE I

| Friction Element | Coefficient of Friction at °F. | | | | Wear (in./hp-hr) × $10^2$ at °F. | | | | Overall Wear (%) | |
|---|---|---|---|---|---|---|---|---|---|---|
| | 400 | 600 | 800 | 400 | 400 | 600 | 800 | 400 | Thickness | Weight |
| 22% NP* | .35 | .38 | .49 | .29 | 0.6 | 5.3 | 6.4 | 4.5 | 34.8 | 35.6 |
| 39% NP | .33 | .34 | .38 | .27 | 0.8 | 5.4 | 13.6 | 2.9+ | 43.0 | 43.5 |
| Control (CNSL) | .38 | .36 | .36 | .32 | 0.7 | 5.6 | 19.1 | 2.7 | 55.0 | 55.3 |

*average of 2 tests
+71 cycles

The results of this example clearly demonstrate that friction elements formulated with the novel friction particles of this invention exhibit significantly better wear than friction elements formulated with a commercially available CNSL friction particle. This is particularly evident for the high temperature cycles at 800° F. which is a temperature often encountered in heavy duty applications such as in trucks or buses.

EXAMPLE 2

A friction particle composition containing a styrenated phenol was prepared by charging to the apparatus described in Example 1, 81 grams (0.86 mole) of phenol, 0.23 grams of concentrated sulfuric acid (98%) and 19 grams of styrene (0.18 mole); the mixture was heated at 75° C. for 0.5 hour, and cooled to about 60° C.; the resulting mixture was composed of about 21 mole percent styrenated phenol and about 79 mole percent of phenol. To this mixture there were added 54.3 grams of a 50 percent aqueous formaldehyde solution (0.9 mole), 9 grams (0.06 mole) of hexamethylenetetramine, 2.4 grams of gum arabic, 0.6 grams of jaguar gum and 109 grams of water. The mixture was heated at atmospheric reflux for 4 hours. The particles that formed were isolated by suction filtration, washed with water, and dried at 60° C. for 45 minutes in a fluidized bed dryer.

A friction element was produced and evaluated using a procedure similar so that described in Example 1. The results are shown in Table II.

The procedure was repeated to produce a friction particle composition based on 11 mole percent nonylphenol modified aromatic resin; in this synthesis the phenol charge was 168.5 (1.79 moles) grams and the nonylphenol charge was 50 grams (0.22 moles); all other synthesis parameters were the same as above. Drying was effected at 60° C. for 0.5 hour.

EXAMPLE 4

Two friction elements were produced using the procedure of Example 1. Each contained 65 weight percent metallic fibers typical of materials being used to replace asbestos as the major component of friction elements, 15 weight percent of an epoxy-modified novolak as a friction binder, 10 weight percent barium sulfate as filler and 10 weight percent of friction particles. One friction element was prepared using the 39 mole percent nonylphenol based friction particle of Example 1 and for comparative purposes the second friction element was prepared using the commercially available CNSL based friction particle used in Example 1 as a control. The friction elements were evaluated as follows:

Each friction element was mounted on the friction testing machine used in Example 1. The friction element remained in contact with the rotating drum for the duration of the test (about 19 minutes) while the drum temperature was gradually increased from 200° F. to

TABLE II

| Coefficient of Friction at °F. | | | | Wear (in/hr-hr) × 10² at °F. | | | | Overall Wear % | |
|---|---|---|---|---|---|---|---|---|---|
| 400 | 600 | 800 | 400 | 400 | 600 | 800 | 400 | Thickness | Weight |
| .35 | .40 | .45 | .12 | 0.4 | 6.1 | 13.4 | 3.3 | 48.2 | 49.2 |

The results of this Example demonstrate that friction particles based on styrenated phenol exhibit comparable or improved wear characteristics when compared to the CSNL based friction particles of Example 1.

EXAMPLE 3

A friction particle composition containing a resin comprising 16.1 mole percent t-butylphenol and 83.9 mole percent phenol was prepared by charging to the apparatus described in Example 1, 162.2 grams (1.72 moles) of phenol, 50 grams (0.33 moles) of t-butylphenol and 192.6 grams of a 50 percent aqueous formaldehyde solution (3.21 moles); the pH of this mixture was adjusted to 8.1 by addition of a 47 percent aqueous solution of sodium hydroxide. The mixture was heated at reflux at atmospheric pressure for two hours, cooled to 50° C., and there were then added 4.8 grams of gum arabic, 1.2 grams of guar gum and 305 grams of water. The mixture was stirred for five minutes and the pH adjusted to 1.7 by addition of 5 N sulfuric acid. The mixture was heated at reflux for 2.75 hours after which the particles that formed were isolated by suction filtration, washed with water, and dried at room temperature for 1.5 hours.

900° 1 F. The friction force was held constant and variations in the coefficient of friction were compensated by changes in the applied force normal to the drum surface. The total work on the test sample was then calculated and divided into the wear loss to obtain normalized were factors. The percent green fade, high temperature fade and recovery were also measured and the results are shown in Table III. As used herein green fade refers to the percentage loss in coefficient of friction in going from 200°–400° F. to 450°–650° F. and high temperature fade is the percentage loss in coefficient of friction in going from 450°–600° F. to 700°–900° F.

TABLE III

| Friction Element | Coefficient of Friction | | | Green Fade % | High Temp. Fade % | Recovery % | Wear Factor | |
|---|---|---|---|---|---|---|---|---|
| | 200–400 | 450–650 | 700–900 | | | | Thickness | Weight |
| 39% NP | .30 | .27 | .16 | 10 | 41 | 112 | 0.01 | 0.9 |
| Control (CNSL) | .29 | .25 | .20 | 14 | 20 | 97 | 0.02 | 1.2 |

The results of this example demonstrate that the friction particle compositions of this invention display improved wear characteristics over conventional CNSL friction particles when used in non-asbestos, semi-metallic friction elements.

EXAMPLE 5

Four friction particle compositions were prepared containing a resin based on 22 mole percent nonylphenol and 78 mole percent phenol, following a procedure similar to that of Example 1 except that the amount of protective colloid was different for each composition.

Each composition contained 4.8 grams of gum arabic but the amount of jaguar gum differed for each composition; all other components and amounts were the same as recited in Example 1. After the synthesis, the dried friction particles were sieved successively through four different screens of increasingly greater mesh. The percent of each composition retained on each screen is shown in Table IV.

TABLE IV

| Guar Gum | Percent Particles Retain On Screen Mesh | | | | |
|---|---|---|---|---|---|
| (grams) | 18 | 40 | 65 | 100 | Remainder |
| 0 | 0.8 | 37.3 | 46.8 | 8.9 | 6.2 |
| 1.2 | 0 | 0.5 | 92.9 | 0 | 6.2 |
| 1.8 | 0 | 1.7 | 44.6 | 26.5 | 27.2 |
| 2.4 | 0 | 4.2 | 31.6 | 16.2 | 48 |

The results demonstrate that generally the greater is the amount of interfacial agent in the friction particle formulation the smaller is the particle size of the friction particles. This allows the maker of friction particles greater flexibility in manufacturing the friction particles of this invention to make friction particles of a specific size to suit his needs.

EXAMPLE 6

There were charged to a reaction flask 200 grams (2.13 moles) of phenol, 60 grams (0.21 moles) of linseed oil and 1.4 grams of concentrated sulfuric acid. The solution was heated to 160° C. and kept there until a 1 ml sample was miscible in 9 ml of methanol. The resulting mixture was composed of about 10 mole percent linseed oil substituted phenol and about 90 mole percent phenol. The solution was then cooled to room temperature and 192.6 grams of a 50% aqueous formaldehyde solution (3.27 moles) was added. The pH was adjusted to 8 with 47 percent sodium hydroxide and the mixture was refluxed at atmospheric pressure for 2 hours. The reaction mixture was cooled to 70° C. and there were added 305 grams of water, 4.8 grams of gum arabic and 1.2 grams of guar gum followed by stirring for about 15 minutes. There then was added 15 ml of 5 N sulfuric acid and the mixture was refluxed for three hours. The particles which formed were isolated by filtration, washed twice with water and once with hexane and then dried under vacuum at 90° 1 C. for 6 hours.

EXAMPLE 7

The procedure of Example 6 was repeated except that there were charged only 40 grams (0.14 mole) of linseed oil and there were additionally charged 20 grams (0.07 mole) of tung oil. The resulting phenolic mixture was composed of about 10 mole percent of linseed oil-tung oil substituted phenol and about 90 mole percent of phenol. Following the procedure of Example 6, hard particles were produced and isolated. Drying was done in a vacuum oven overnight at room temperature.

EXAMPLE 8

There was charged to a reaction flask 200 grams (2.13 mole) of phenol, 144 grams of a 50 percent aqueous solution of formaldehyde (2.40 moles) 18 grams of hexamethylenetetramine (0.13 mole), 2 grams of gum arabic and 220 grams of water. The reaction mixture was heated to atmospheric reflux and maintained at reflux for 5 hours. The resin was isolated by suction filtration, washed with water, and dried at 90° C. for about 16 hours.

The example illustrates the synthesis of friction particles of this invention which do not contain difunctional phenol.

What is claimed is:

1. In a process for the production of substantially completely cured resin friction particles the essential steps of:
    (A) reacting, in an aqueous medium at a temperature of from about 50° C. to about 100° C., (I) a mixture of phenols, said mixture comprised of from 25 to 100 mole percent of tri-and/or tetrafunctional phenols and from 0 to 75 mole percent of difunctional phenols; (II) from 1.1 to 3 moles per mole of phenol moiety of an aldehyde containing from 1 to 11 carbon atoms, (III) from 0.01 to 1 mole per mole of phenol moiety of a reaction promoting compound chosen from the group of alkali and alkaline earth hydroxides and oxides and the primary, secondary and tertiary amines having up to 10 carbon atoms and (IV) from 0.05 to 6 weight percent of a protective colloid based on the weight of compounds (I), (II) and (III); for a period of time such that a particulate, heat reactive, and substantially water-insoluble phenol resin is formed which is dispersed in said aqueous medium;
    (B) adding an acid compound to the aqueous dispersion of step (A) in an amount such that the pH of the aqueous dispersion is from 0 to 4, and substantially completely curing the resin particles, and
    (C) separating the resin particles from the aqueous medium.

2. A process as claimed in claim 1 wherein said mixture of phenols (I) is comprised of from 55 to 100 mole percent tri-and/or tetrafunctional phenol and from 0 to 45 mole percent of difunctional phenol.

3. A process as claimed in claim 1 wherein said tri-and/or tetrafunctional phenol is monohydroxybenzene.

4. A process as claimed in claim 1 wherein said difunctional phenol is p-nonylphenol.

5. A process as claimed in claim 1 wherein said difunctional phenol is p-t-butylphenol.

6. A process as claimed in claim 1 wherein said difunctional phenol is styrenated phenol.

7. A process as claimed in claim 1 wherein said difunctional phenol is chosen from the group of linseed oil substituted phenol and linseed oil-tung oil substituted phenol.

8. A process as claimed in claim 1 wherein said mixture of phenols (I) is comprised of about 78 mole percent phenol and about 22 mole percent p-nonylphenol.

9. A process as claimed in claim 1 wherein said aldehyde (II) is present in a concentration of from 1.1 to 2 mole per mole of phenol moiety.

10. A process as claimed in claim 1 wherein said aldehyde (II) is formaldehyde.

11. A process as claimed in claim 1 wherein said reaction promoting compound (III) is present in a concentration of from 0.01 to 0.2 mole per mole of phenol moiety.

12. A process as claimed in claim 1 wherein said reaction promoting compound (III) is hexamethylenetetramine.

13. A process as claimed in claim 1 wherein said protective colloid (IV) is present in a concentration of from 0.1 to 5 weight percent.

14. A process as claimed in claim 1 wherein said protective colloid (IV) is present in a concentration of from 2 to 3 weight percent.

15. A process as claimed in claim 1 wherein said protective colloid (IV) is a mixture of protective colloids.

16. A process as claimed in claim 1 wherein said protective colloid (IV) is selected from the group consisting of gum arabic, guar gum, and mixtures thereof.

17. A process for the production of substantially cured resin friction particles comprising the steps of:
(A) reacting, in an aqueous medium at a temperature of from about 90° C. to about 100° C.
  (I) a mixture of phenols comprised of about 78 mole percent phenol and 22 mole percent p-nonylphenol;
  (II) from 1.1 to 2 moles of formaldehyde per mole of phenol moiety in (I) above;
  (III) from 0.01 to 0.2 mole of hexamethylenetetramine;
  (IV) from 2 to 3 weight percent, based on the total weight of compounds (I), (II), and (III, of a protective colloid selected from the group consisting of gum arabic, jaguar gum, and mixtures thereof,
for a period of time such that a particulate resin is formed which is dispersed in said aqueous medium;

(B) adding an acid compound to the aqueous dispersion of step (A) in an amount such that the pH of the aqueous dispersion is from 0 to 4;
(C) substantially completely curing the resin particles; and
(d) separating the resin particles from the aqueous medium.

18. A substantially cured friction particle produced in accordance with the process of claim 1.

19. A friction element formulated with from about 1 to about 25 weight percent of a friction particle comprising:
(I) a mixture of phenols said mixture comprised of from 25 to 100 mole percent of tri- and/or tetrafunctional phenols and from 0 to 75 mole percent of difunctional phenols;
(II) from 1.1 to 3 mole per mole of phenol moiety of an aldehyde containing from 1 to 11 carbon atoms;
(III) from 0 to 1 mole per mole of phenol moiety of an reaction promoting compound chosen from the group of primary, secondary and tertiary amines having up to 10 carbon atoms; and
(IV) from 0.05 to 6 weight percent of a protective colloid based on the weight of compounds (I), (II), and (III).

20. A friction element as claimed in claim 19 formulated with from 5 to 15 weight percent of said friction particle.

* * * * *